United States Patent [19]

Fingerhut et al.

[11] Patent Number: 4,685,155
[45] Date of Patent: Aug. 11, 1987

[54] COMPOSITE INSULATION MATERIAL

[75] Inventors: Arthur L. Fingerhut, 1052 Elston Dr., Mountainside, N.J. 07092; Howard W. Fingerhut, Edison, N.J.

[73] Assignee: Arthur L. Fingerhut, Mountainside, N.J.

[21] Appl. No.: 709,457

[22] Filed: Mar. 8, 1985

Related U.S. Application Data

[63] Continuation-in-part of Ser. No. 493,667, May 11, 1983, Pat. No. 4,583,247, which is a continuation-in-part of Ser. No. 348,224, Feb. 12, 1982, abandoned.

[51] Int. Cl.$^4$ ............................................. A41D 27/02
[52] U.S. Cl. .......................................... 2/272; 2/81; 2/87; 2/DIG. 1; 604/385 R; 428/137; 428/138
[58] Field of Search ................ 2/272, 81, 87, DIG. 1, 2/243 A; 112/420; 428/137, 138, 158–160, 179, 182, 186; 604/385.1

[56] References Cited

U.S. PATENT DOCUMENTS

| | | | |
|---|---|---|---|
| 3,703,432 | 11/1972 | Koski | 2/87 X |
| 3,849,802 | 11/1974 | Govaars | 2/81 |
| 3,929,135 | 12/1975 | Thompson | 604/385.1 |
| 4,136,222 | 1/1979 | Jonnes | 2/272 X |
| 4,230,057 | 10/1980 | Kurz | 112/420 |
| 4,323,069 | 4/1982 | Ahr et al. | 428/137 X |
| 4,420,521 | 12/1983 | Carr | 428/138 X |
| 4,525,406 | 6/1985 | Pollock | 428/138 X |
| 4,569,874 | 2/1986 | Kunetz | 428/137 X |
| 4,583,247 | 4/1986 | Fingerhut et al. | 2/272 X |

FOREIGN PATENT DOCUMENTS

2104770  3/1983  United Kingdom ............. 2/DIG. 1

Primary Examiner—Werner H. Schroeder
Assistant Examiner—J. S. Olds
Attorney, Agent, or Firm—Lerner, David, Littenberg, Krumholz & Mentlik

[57] ABSTRACT

A composite sheet material for garments and the like is disclosed. The composite sheet material comprises a substantially continuous internal layer of porous material having low heat conductivity and high resilience. The internal layer is of a substantially uniform thickness and consistency, and its composition and thickness is such that it is supple and drapable. A flexible sheet of liquid impermeable material is adhered to the internal layer, and the flexible sheet having a plurality of capillary openings extended therethrough. The capillary openings each have a base open to one surface of the flexible surface and lying substantially in the plane of the flexible sheet, an apex extending away from the opposite surface of the flexible sheet and remote from the plane of the flexible sheet, and are of a character so as to inhibit the flow of fluids therethrough. The flexible sheet is adhered to the internal layer in an orientation such that the apexes of the openings face away from and are remote from the internal layer. Such a composite sheet material provides a breatheable sheet material for providing comfort to the wearer, and also exhibits improved water and wind resistance as well as good heat insulating characteristics and quietness.

70 Claims, 8 Drawing Figures

COMPOSITE INSULATION MATERIAL

RELATED APPLICATION

This is a continuation-in-part of application Ser. No. 493,667, filed May 11, 1983, now U.S. Pat. No. 4,583,247 which in turn is a continuation-in-part of application Ser. No. 348,224, filed Feb. 12, 1982, now abandoned.

FIELD OF THE INVENTION

This invention relates to an improved interlining for garments, blankets, comforters, sleeping bags, and the like.

BACKGROUND OF THE INVENTION

The most prevalent methods for inserting insulation material into winter garments generally involve filling the garments with loose insulating material. For example, winter coats filled with down material throughout the body portion and sleeves are well known. Similarly, various polyester fibers may be used in place of the down. Such garments are bulky and tend to limit one's freedom of movement. Also, the loose fibers shift, settle, mat and are difficult to work with. Further, their insulating characteristics are drastically reduced if they are wet.

More recently, composite sheets of thermal insulating material have been employed to produce less bulky, looser winter garments. A composite thermal insulating interlining sheet material of the type which is the subject of the present invention is disclosed in U.S. Pat. No. 4,136,222.

U.S. Pat. No. 4,136,222 relates to a thermally insulating composite sheet material which may be used as an interlining material for garments, blankets, etc. The composite sheet material of this patent comprises at least one thin lightweight drapable sheet carrying a vapor-deposited layer of specularly reflective material on at least one surface, and a layer of segments of insulating material, which segments cover preferably between about 10 percent and 30 percent of the area of the layer of specularly reflective material up to a maximum of 60 percent of such area. The area of the layer of insulating material is minimized to provide as great an open area as possible ranging from 40 percent to as high as 90 percent so that the reflecting layer will be utilized most efficiently to reflect heat back to the body of the wearer, i.e., body heat radiated in the form of infrared radiation is reflected. Although the disclosure of U.S. Pat. No. 4,136,222 makes reference to the low emissivity of the specularly reflective layer, it stresses the reflective feature of such layer and, in fact, notes that use of a fibrous spacer (rather than spacer segments) would take away much of the function of the specularly reflective layer. Thus, the layer of insulating material is used principally as a spacer means rather than for the insulating qualities of its material, so as to permit, in use, direct and substantially unimpeded exposure of the specularly reflective layer to infrared radiation emitted from the body of the wearer which can then be reflected back. In other words, the spaced, large openings are deemed necessary in the interlining material of U.S. Pat. No. 4,136,222 to achieve the reflection, and thus insulating, characteristics of the insulating composite sheet material. However, the need for spaced, large openings in the spacer layer of the U.S. Pat. No. 4,136,222 patent results in complex manufacturing techniques and increased cost per yard of the final product.

The use of reflective layers of material for providing protection against extreme cold is known, as is evidenced, for example, by U.S. Pat. No. 3,849,802 which relates to a temperature protective suit comprising a strong fabric coated on both sides with a thin layer of heat-reflective metal. This patent discloses that, in the alternative, there may be a metallic coating on only one layer. The fabric, however, is not suited for or intended to be used as an interlining material for garments and the like. Rather, the invention therein is directed to a reversible temperature protective garment for the preservation and protection against heat and cold. The reflectivity of the metallic coating is utilized to preserve body heat when heat is to be retained. In such event, the shiniest side is on the inside. Thus, as in the product of U.S. Pat. No. 4,136,222, reflection of the body heat is the predominant characteristic to maintain body warmth. Therefore, when heat resistance is desired, the shiniest side is disposed on the inside to face the wearer.

The use of a continuous layer or layers of insulating material in a composite insulating fabric is taught in U.S. Pat. No. 3,541,620 which discloses a fabric which includes juxtaposed thin layers of polyurethane foam and polystyrene in combination with a waterproof material. The resultant waterproof fabric is particularly suited for sleeping bags and the like.

SUMMARY OF THE INVENTION

According to the present invention, there is provided a simplified, inexpensive and effective composite interlining sheet material for garments and the like which comprises a substantially continuous internal layer of porous material having low heat conductivity and high resilience. The internal layer is of a substantially uniform thickness and consistency, and its composition and thickness is such that it is supple and drapable. Preferably, the internal layer is continuous over at least 80 percent of the area of the interlining mateial, and still more preferably, over at least 90 percent of the area of the interlining material. A continuous layer of flexible reflective material is bonded to the outside of the internal layer at at least spaced intervals and functions to reduce the conduction of heat away from the internal layer and decrease the emissivity of the composite sheet, the outside being the side which is to be disposed away from the body of the wearer or person when used as an interliner of a garment or the like when it is desired to maximize heat retention.

In one preferred embodiment, the layer of flexible reflective material comprises a layer of clear plastic over a coating or layer of reflective material to protect the reflective material against oxidation, corrosion or abrasion. The clear plastic may be made of an olefin which does not unduly deleteriously detract from the desired low emissivity of the reflective layer. Abrasion and corrosion would be a particular problem if the garment were to be subjected to machine washing and drying. Also, in the preferred embodiment, the thickness of the complete interlining sheet material is about ⅛ inch or less and includes within such thickness a drapable, flexible inner layer disposed on the inner side of the internal layer. The outer layer, internal layer and inner layer are bonded together at at least spaced intervals to provide an improved composite drapable thermal insulating interlining material which is simple to manufacture and work with, and is relatively inexpensive.

In another preferred embodiment, the surface of the composite sheet material facing away from the reflective surface comprises a non-reflective surface so that heat retention is maximized when the composite sheet material is disposed as an interlining of a garment or the like with the first surface of the internal layer facing away from the body of the wearer, while heat retention is minimized when the composite sheet is disposed as an interlining with the first surface of the internal layer facing towards the body of the wearer. This reversibility feature of the composite sheet material of the present invention thus allows the control of the insulation value and comfort value of the garment to the wearer. Here it is to be noted that this reversibility feature is particularly suitable with the composite sheet material of the present invention because it takes advantage of the mechanism of low emissivity of the reflective surface and the heat gradient provided by the internal layer of insulation material in contact therewith.

The composite sheet material of the present invention utilizes the mechanism of the low emissivity of the outer reflective layer in combination with the insulating quality of the layer of insulating material to provide the desired thermal insulation. In this regard, the inventors have found that the utilization of the foregoing combination of thermal insulating properties results in a composite material which is more effective for heat retention than the interlining material of U.S. Pat. No. 4,136,222 without its drawbacks resulting from the requirement of providing a segmented spacer layer. The inventors attribute at least a portion of this result to the fact that the outer reflective layer in combination with the substantially continuous layer of insulating material in contact therewith produces a heated layer or zone at the reflective layer due to its low emissivity which then, due to its contact with the continuous layer of insulating material, produces a heat gradient from the heated zone back towards the wearer which tends to reduce the rate of heat conduction away from the wearer's body. In fact, when the composite sheet material is reversed so that the reflective layer faces towards the body of the wearer, such as when the garment is reversed, the heat gradient is disposed away from the wearer's body which tends to reduce the rate of heat conduction toward the wearer's body and reduce the inhibition of heat flow away from the wearer's body, vis-a-vis if the composite sheet material is disposed in the other direction, thereby providing more comfort to the wearer in warmer weather.

According to a further aspect of the present invention, there is provided a composite sheet material for garments and the like which is comprised of a substantially continuous internal layer of porous material having a low heat conductivity and high resiliency, and a flexible sheet of liquid impermeable material adhered to the internal layer, the flexible sheet having a plurality of capillary openings extending therethrough. The internal layer is of a substantially uniform thickness and consistency, and its composition and thickness is such that it is supple and drapable. As for the flexible sheet of liquid impermeable material, the capillary openings thereof each having a base open to one surface of the flexible sheet and lying substantially in the plane of the flexible sheet, an apex extending away from the opposite surface of the flexible sheet and remote from the plane of the flexible sheet, and are of a character so as to inhibit the flow of fluids therethrough. The flexible sheet is adhered to the internal layer in an orientation such that the apexes of the openings face away from and are remote from the internal layer. When used as an interlining for garments and the like, the composite sheet material is disposed of that the apexes of the openings face away from the body of the wearer. Such a composite sheet material provides a breathable sheet material for providing comfort to the wearer, and also exhibits improved water and wind resistance as well as good heat insulating characteristics and quietness.

In accordance with a preferred embodiment of this aspect of the present invention, the capillary openings are of a tapered nature, and the outwardly facing surface of the composite sheet material, i.e. the surface from which the tapered capillary structures extend, is substantially continuously reflective so as to provide a surface having a decreased emissivity to thereby reduce the conduction of heat in a direction away from the internal layer.

These and further features and characteristics of the present invention will be apparent from the following detailed descriptions in which reference is made to the enclosed drawings which illustrate preferred embodiments of the present invention.

BRIEF DESCRIPTION OF THE PREFERRED EMBODIMENTS

Figures 1, 2, 3, 4, 5:
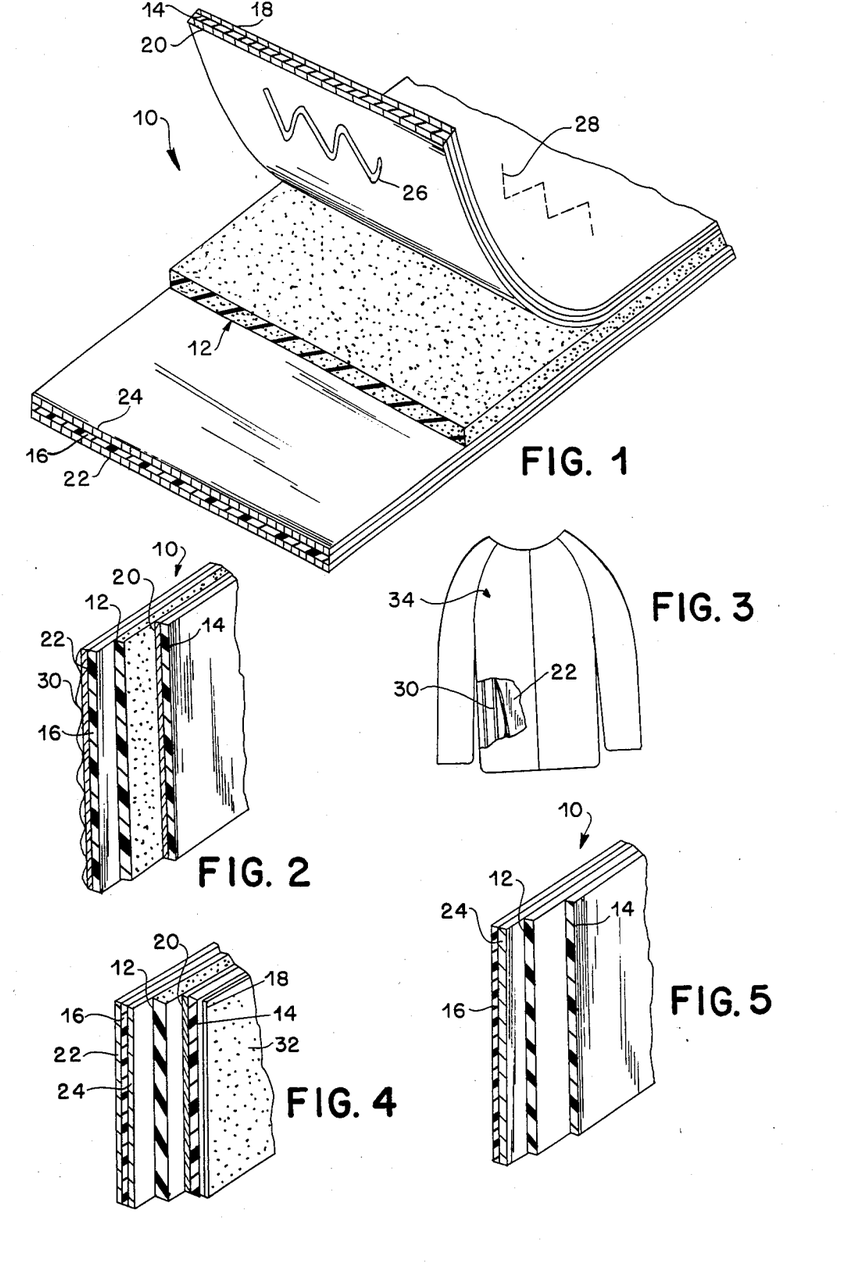
FIG. 1 is a perspective view showing the various layers of the composite thermal insulating interlining material of the present invention.
FIG. 2 is another perspective view showing another embodiment of the present invention.
FIG. 3 shows the composite interlining material of the present invention being used in a garment.
FIG. 4 is another perspective view showing another embodiment of the present invention.
FIG. 5 is another perspective view showing a still further embodiment of the present invention.

Referring to FIG. 1, there is shown an example of a composite thermal insulating interlining material embodying the concepts of the present invention, designated by reference numeral 10, which includes a substantially continuous internal layer 12 of porous material having low heat conductivity and high resilience. The composite interlining material 10 of FIG. 1 includes an inner layer of material 14 disposed on one side of the internal layer 12, and an outer layer 16 of material disposed on the other side of said internal layer 12. The composite material 10 is adapted to be used as an interlining material for garments, blankets, comforters, sleeping bags and the like in which, for maximum heat retention, the composite sheet material 10 will be disposed in the garment or the like so that the outer layer 16 will face away from the body of the wearer or person to be protected and the inner layer 14 will face towards the body of the wearer or person to be protected.

In the embodiment shown in FIG. 1, the inner layer 14 includes layers 18 and 20 of reflective material disposed on one or both surfaces thereof, and the outer layer 16 includes layers 22 and 24 of reflective material disposed on both surfaces thereof.

As will be noted from FIG. 1, the internal layer 12 and the layers 14 and 16 are adhered to each other by adhesive material 26 which is disposed in a pattern on the inner surfaces of layers 14 and 16 or on internal layer 12. Since the adhesive material 26 is disposed in a pattern and at spaced-apart intervals, when all of the layers are adhered together, the composite insulation interlining material 10 has increased suppleness, drapability, flexibility, and other desirable characteristics. A similar pattern of adhesive 26 is disposed on the inner surface of layer 16, although not specifically shown. It should also be understood that the adhesive 26 can be in any desirable pattern or configuration to thereby increase or decrease the characteristics of suppleness and drapability. In certain applications, 100 percent adhesive bond may be satisfactory, such as where the inner and outer layers 14, 16 are very thin or highly flexible. It should also be noted that within the scope of the present invention, the layers 12, 14, and 16 can be adhered to each other by other suitable means, such as by stitching or sewing the various layers together, again in any desired pattern, to provide the required suppleness and drapability and flexibility. For example, the layers 12, 14 and 16 could be quilted which will provide the advantage of having increased suppleness while maximizing the insulating characteristics by virtue of providing increased air retention between the garment and the body of the wearer. A still further alternative included within the scope of the present invention is to adhere the layers 12, 14, and 16 using ultrasonics in a desired pattern or array, such as for example the pattern for the adhesive 26, to provide the aforementioned desired characteristics.

The substantially continuous internal layer 12 in accordance with the present invention is preferably porous so as to contain air or gas therein. As is well known, air is an excellent insulating medium. Therefore, by providing a porous material which will entrain air or another gas therein, the material will possess excellent insulating characteristics. The pore size of the material should be kept at a minimum in order to minimize convection while maximizing air or gas entrainment. Also, the porous material should be chosen to have a low heat conductivity. Further, the porous material should be of high resilience so that it has the ability to regain its original shape in order to maintain its insulating characteristics. In addition, the porous material should be of high flexibility so that the composite interlining material 10 will be supple and drapable when inserted into a garment or the like.

A number of materials have the desired characteristics. For example, the internal layer 12 may be a natural fibrous material, such as wool, cotton, cellulose, rayon, or flannel material, and such fibrous materials may be woven or non-woven. The particular natural fiber selected, and whether it should be woven or non-woven, depends on the degree of flexibility, suppleness, and drapability which may be required for the particular application of the composite thermal insulation material of the present invention. For example, if the composite material 10 is being used as insulation material in a garment, then the characteristics of flexibility and suppleness are important. On the other hand, if the composite material 10 is being used as insulation material in a comforter or a blanket, the characteristics of drapability may be less important, and a more rigid material could be used.

In still other embodiments, the internal layer 12 may be a synthetic material, such as nylon, polyester, dacron, urethanes, rubber, or foam. In this regard, the internal layer would preferably comprises a synthetic foam material, such as a polyurethane foam material. Again, the particular material selected for the internal layer 12 depends on the particular application for the composite insulation material 10, such as an interlining for a garment, a sleeping bag, or blanket, which will then determine the required degree of such characteristics as flexibility, suppleness, drapability, and/or air circulation.

In terms of being substantially continuous, the internal layer 12 should be continuous over at least 80 percent of the area of the interlining material 10 and more prefereably continuous over at least 90 percent of the area. In others, the size of any open areas through the internal layer should be limited so as not to be greater than 20 percent, and more preferably no greater than 10 percent of the area of the internal layer 12. In this regard, by open aras, it is meant areas which are devoid of the porous material as opposed to any void spaces or regions in the porous material which do not extend completely through the thickness of the layer 12. Of course, still more preferably, the proous material is continuous or occupies the entire area of the internal layer 12.

Turning now to the inner layer 14 having reflective layers 18 and 20 disposed thereon, it is noted that inner layer 14 may be formed from any suitable plastic material, rubber material, foam, non-woven, woven, or spunbonded fabrics, or urethane, depending on the application. Preferably, the reflective layers 18 and 20 are metallized layers, such as aluminum or the like, deposited on the layer 14. In a preferred embodiment, the layer 14 is formed of a polyolefin material, and the reflective material 18 and 20 deposited thereon is aluminum. The outer layer 16 may be identical to the inner layer 14, and the reflective layers 22 and 24 may be identical to reflective layers 18 and 20, and therefore, all of the comments with regard to layers 14, 18, and 20 apply to layers 16, 22, and 24.

It should also be noted that in certain applications of the present invention, as shown for example in FIG. 2, one of the reflective layers 18 or 20 may be deleted from inner layer 14, and the same is true with regard to deleting one of the reflective layers 22 or 24 from outer layer 16. This is particularly so when the layers 14 and/or 16 are of a clear or transparent flexible material. Also, as shown in FIG. 5, both reflective layers 18 and 20 may be deleted from the inner layer 14, i.e., the layer 14 which is to face the wearer or person when the composite material 10 is disposed as the interlining of a garment or the like for maximum heat retention.

In this regard, what is most important in accordance with the present invention is that the outer layer 16 be in contact with a substantially continuous internal layer 12 and be reflective in a direction facing away from the internal layer 12, i.e., in a direction facing away from the body of the wearer or person when the composite material 10 is disposed as an interlining in or between fabric layers of a garment, blanket or the like for maximum heat retention. For example, in the embodiment shown in FIG. 5, the layer 16 is made of a clear, transparent plastic material so that the inner reflective layer 24 is sandwiched between the clear plastic material and the surface of the internal layer 12. In this manner, the composite sheet material 10 will utilize the mechanism of low emissivity of the outer reflective layer 16 in combination with the insulating quality of characteristics of the internal layer 12 to provide the desired thermal insulation. This is believed to be due, at least in part, to the combination of the substantially continuous layer 12 of insulating material in contact with the outer layer 16 of reflective material which produces a heated layer or zone at the reflective layer 16 due to its low emissivity which then, due to its contact with the continuous internal layer 12 of the insulating material, produces a heat gradient from the heated zone back towards the wearer which reduces the rate of heat conduction away from the body. Also, because of the low emissive characteristics of the outer layer 16, less heat will be conducted away from the layer 16, thereby reducing heat conduction away from the body when the composite interlining material 10 is placed in a garment or the like.

Inclusion of all of the reflective layers 18, 20, 22 and 24 may be desirable under some circumstances to provide added insulating benefits, such as for example when the composite interlining material 10 is to be used in garments for extremely cold environments.

As also may be seen in FIG. 1, the outer surfaces of the inner and outer layers 14 and 16 may be embossed in any desired pattern, such as indicated by the dashed line designated 28, to further increase the softness and suppleness of the composite thermal insulation interlining material 10 for certain applications, such as a golf jacket. Such embossing, particularly on the outer surface of the inner layer 14, can also be advantageous in inhibiting laminar air flow when the composite interlining material 10 is worn in a garment, thereby further increasing the thermal gradient between the outer layer 16 of reflecting material and the body of the wearer by providing a further "dead-air" space. Further, as noted above, quilting of the layers 12, 14 and 16 provides increased suppleness as well as increased air retention for greater insulating values.

In accordance with the present invention, various tests have been conducted to evaluate the improved characteristics of the composite interlining material 10 of the present invention. One series of tests was directed to determining the thermal transmittance of six different composite insulation materials each of which included an internal layer, made of porous material having a low heat conductivity and high resilience, and inner and outer layers 14, 16 of flexible reflective material adhered thereto. More particularly, each of the six composite insulation materials comprised an internal layer 12 comprised of a one-eighth inch thick polyurethane foam material having thin, flexible metallized films adhered thereto. The metallized films were each produced by depositing a thin layer of aluminum onto a thin clear, transparent olefin sheet. The metallized films thus had a "bright" or shiny side (facing away from the plastic sheet on which the layer was deposited) and a less shiny side facing the plastic sheet.

In the first composite material (I) tested, the internal layer 12 was continuous over its entire surface area and the metallized films were adhered to opposite surfaces of the internal layer so that the shiniest or brightest side of the metallized film faced outwardly away from the internal layer 12. The second composite material (II) tested was identical to the first composite material, but additionally, the metallized layers 14, 16 each were perforated with a needle in a manner so as to provide 45 perforations per square inch. (The method of perforating comprised what is generally known as porolating in which a needle pierces the material but does not remove any material.) The perforations were evenly spaced over the surface of the material. The third composite insulation material (III) was similar to composite insulation material (I), with the exception that the internal layer of foam was cut or punched so as to provide open areas therethrough amounting to approximately 8 percent of the surface area of the internal layer. Additionally, the bright or shiny side of the metallized layers was arranged to face inwardly toward the internal layer of foam. The fourth composite insulation material (IV) was identical to material (III) with the exception that the metallized layers were each perforated to provide 45 evenly spaced perforations per square inch. The fifth composite insulation material (V) was similar to composite material (III) with the exception that the internal layer was cut or punched so as to provide open areas therethrough amounting to approximately 20 percent of the surface area (i.e., the porous foam occupied 80 percent of the area of the composite material). Also, the bright or shiny side of the metallized layers each faced inwardly toward the foam. The sixth composite insulation material (VI) was similar to the composite material (III) but included a thin flexible medium blue colored plastic layer adhered over one of the metallized layers so that the less shiny side was completely covered. Thus, for the covered layer, the only reflective surface faced inwardly; the outwardly facing surface was non-reflective.

Each of the above-noted composite insulation materials (I–VI) were tested in accordance with ASTM standard D-1518. This test is directed to determining the thermal transmittance of the materials between a guarded hot plate and the cool atmosphere, and provides an indication of thermal transmittance as a result of the combined action of convention, conduction and radiation. From this test, the thermal resistance or R value (which is the reciprocal of thermal conductivity) can be determined, as well as the "Clo" which is a textile term directly related to the insulation or warmth of a textile product. A higher "Clo" value would be indicative of a warmer item. Each of the materials I–V was tested by placement of the composite materials on the guarded hot plate with one of the metallized layers in contact therewith. With respect to composite insulation material VI, the material was placed on the guarded hot plate so that the medium blue plastic layer faced upwardly away from the guarded hot plate.

The results of the tests are summarized as follows:

| Composite Insulation Material | R Value (Thermal Resistance of Fabric Alone) | "CLO" Value (Insulation Value) |
| --- | --- | --- |
| I. | 3.057 | 3.479 |
| II. | 2.859 | 3.254 |
| III. | 2.941 | 3.347 |
| IV. | 2.742 | 3.120 |
| V. | 2.120 | 2.413 |
| VI. | 1.914 | 2.178 |

From the above test results, it can be seen that the composite insulation material exhibiting the greatest thermal resistance and "Clo" values was the composite insulation material I in which the internal layer 12 was continuous over the entire sample and in which the metallized layers 14, 16 were directed so that the higher reflective surfaces were directed outwardly away from the internal layer 12. In this regard, it should be noted that with the metallized films utilized, both the brighter surface and the less bright surface are still reflective. Therefore, even when the brighter surface was directed inwardly toward the internal layer 12 (such as in composite material III), the outwardly directed less bright surface was still effective to provide significant thermal resistance. The fact that it is the outwardly facing surface which is most effective in providing the thermal resistance is clearly evident from consideration of the composite insulation material VI wherein the outer surface was covered with a medium blue plastic film which is not reflective. As will be appreciated from comparing the R values for materials I, III and VI, the thermal resistance for the materials I and III in which the outwardly facing surfaces were reflective was significantly higher than for the material VI in which the outwardly facing surface was not reflective, i.e., 60 percent and 56 percent higher for materials I and III in comparison to material VI.

Furthermore, it is also clear from the test results that as the amount of size of open areas or spaces through the internal layer 12 of porous material increase, the thermal resistance decreases. More particularly, comparing material I with materials III and V, it is seen that the thermal resistance progressively decreases as the amount of open areas or spaces increases. For example, it will be noted that the R value for composite material I is 4 percent greater than the R value for composite material III which included an internal layer having an 8 percent open area, whereas material I had an R value which is 44 percent greater than the R value for material V wherein the internal layer 12 had a 20 percent open area. In this regard, it will be recalled that in accordance with the teaching of U.S. Pat. No. 4,136,222, it would be expected that as the size of of the open area increases, the thermal resistance would likewise increase. The test on materials I, III and IV clearly indicates, however, that this is not correct. Further in this regard, it is to be noted that in accordance with the teaching of U.S. Pat. No. 4,136,222, it is stated that the open area should be at least 40 percent of the surface of the material. On the basis of the above test results, it would be expected that if the composite insulation materials were provided with an internal layer having a 40 percent open area therein, the thermal resistance value would be even more significantly reduced. Thus, in accordance with the present invention, the internal layer 12 should be substantially continuous over the area of the internal layer 12. As noted above, by substantially continuous, it is meant that the open or void areas of the internal layer 12 are less than 20 percent of the area of the interlining material 10, more preferably less than 10 percent, and still more preferably continuous over the entire area.

It will also be appreciated from the test results noted above that perforation of the metallized layers in order to provide a degree of breathability for the composite insulation material 10 in accordance with the present invention does not significantly reduce the thermal insulating characteristics. This is evident from comparing materials I and II, and III and IV, wherein it is seen that the reduction in thermal resistance in providing perforations is on the order of less than 6–7 percent.

Additional tests were also performed with respect to two jackets, one jacket having down material therein of approximately three-fourths inch thickness and another jacket having a composite thermal insulation material 10 in accordance with the present invention in which the total thickness of the composite insulation material was one-eighth inch. In the particular embodiment tested, the internal layer was foam material, and the outer layers 14, 16 consisted of polyolefin material and aluminum layers 18 and 22 deposited only on the outer surfaces of said layers 14 and 16 respectively. The outer layers 14 and 16 each had a thickness of approximately one and a half mils (0.0015 inches). The thermal resistance or R value of the down jacket which was tested was 1.779, whereas the jacket including the composite material 10 of the present invention had an R value of 1.715. Since the R values for the two jackets were almost identical, and the insulation material in the down jacket had a thickness of approximately $\frac{3}{4}$ inch and the composite material 10 of the present invention had a thickness of one-eight inch (approximately 3.175 mm), the material 10 of the present invention as shown to be approximately six times as effective as the down material with regard to its thermal resistance. Of course, increased insulating values could be provided by stacking of two or more composite interlining materials 10 on top of one another. In such a circumstance, preferably a suitable spacer would be provided between the stacked composite interlining materials 10 so as to take advantage of the low emissivity characteristics of each layer 16 of reflecting material of each composite interlining material 10. In addition, the material 10 of the present invention had better characteristics with regard to suppleness, drapability, flexibility, softness and ease of manufacture, both from the viewpoint of manufacture of the interlining material 10 and also fabrication of garments. In view of the foregoing, it is believed that the composite thermal insulation material 10 of the present invention as substantially superior characteristics to those of the prior art.

In accordance with the present invention, it is also desirable to reduce the physical contact between the composite insulation interlining material 10 and a fabric that it is being used in conjunction with, such as the fabric of a jacket 34, as shown in FIG. 3. This physical contact may be reduced by a spacer means 30, shown also in FIG. 2. As a result, the insulation value of the composite material 10 is dramatically increased. The spacer means 30 can take the form of raised dots or surfaces or embossed surfaces on the composite material 10. Alternatively, a separate membrane 30 of low conductivity, such as a layer of open mesh rayon, may be employed between composite material 10 and the fabric of the jacket 34.

In accordance with the present invention, it is also desirable to reduce oxidizing of the metallized layer of aluminum or the like and to reduce abrasion thereto. This is accomplished by providing a layer or liquid coating 32 of lacquer, or varnish, or the like over the metallized reflective layer 18 of the inner layer 14 of the composite material 10 as shown in FIG. 4 for the inner layer 14. Of course, a similar coating or layer 32 could be provided for the outer layer 16 as well.

Alternatively, protection of the layers of reflective material could be provided by the sheet material itself onto which the reflective material is deposited. This is shown for example in FIG. 5 in which the outer layer 16 comprises a clear transparent plastic sheet, for example, of an olefin material, onto which a layer of reflecting material 24 is metal deposited, with the layer 16 then adhered at at least spaced intervals to the surface of the continuous internal layer 12 of insulating material. In this manner, outer layer 16 is reflective in a direction away from the continuous internal layer 12, and yet the layer of reflective material 24 will be protected from oxidation and abrasion.

Still further, in accordance with certain embodiments of the invention, it may be desirable to reverse the composite insulating material 10 when placed in an interlining of a garment to control the insulation value and comfort value of the garment to the wearer. For example, in the embodiment in which there is a reflective coating on only the outer layer 16, such as for example shown in FIG. 5, when the outer layer 16 is placed towards the body, it is not as warm and can be used in spring weather. This is believed to be due, at least in part, to the fact that the internal layer 12 of insulating material is on the outside of the reflective layer 16, 24 away from the body of the wearer. Thus, the heat gradient provided by the internal layer 12 with the reflective layer 16, 24 in contact therewith serves to reduce heat conduction toward the wearer's body and to reduce the inhibition of flow away from the wearer's body. On the other hand, when the outer layer 16 which is reflective is facing away from the body, it will have a higher R value and can be used in colder weather. This is believed to be a result of the fact that the major controlling mechanism for providing the insulating benefits of the present construction is the low emissivity characteristics of the outer layer 16.

Further still in accordance with the present invention, it is noted that since the inner and outer layers 14, 16 are made of a nonporous material, the inner and outer layers 14, 16 on the composite sheet 10 act as a moisture barrier which causes a high vapor blanket to envelope the body of the wearer. As a result, there is increased moisture between the body of the wearer and the composite material 10 so that there is a higher comfort value in addition to the increased insulation value of the present invention. Still further, the nonporous layers 14, 16 having the reflective material thereon provides a wind barrier and is water repellent.

In particular embodiments in accordance with the present invention it may be desirable to perforate the composite insulation material using needles or the like to increase the amount of breathability and to reduce the effectiveness of the vapor barrier between the inner and outer layers 14 and 16. As noted above, perforation of the composite interlining material 10 will not significantly affect the insulating characteristics of the material as a result of the perforations. This can be most advantageous in terms of providing for significant comfort.

The preferred method of perforation comprises what is generally known as porolating in which the material is simply pierced with a needle so as not to remove any material. This is advantageous in maintaining wind resistance since the internal layer 12, which is pressed against the inner and outer layers 14, 16, serves to close the pierced holes to prevent any direct path between the inner and outer layers 14, 16. However, breathability is still provided in the preferred embodiment by virtue of the foam material itself being breathable. Of course, if desired, the layers 14, 16 could be punched to remove material therefrom, and further, all of the layers 12, 14, 16 could be pierced or punched, such as when the internal layer 12 is of a closed cell construction which is not normally breathable.

Further in this regard, the present invention provides a capability of being able to vary the breathability characteristics of the material 10, without significantly reducing the insulating characteristics or properties, by controlling the number of holes or perforations, the size of the perforations, and the distribution of the perforations (e.g., so that the perforations in the inner and outer layers are not aligned with one another but rather are offset). Additionally, the perforations can be placed at a angle through the composite insulation material 10 which can be advantageous in providing for waterproofing the material 10 but still providing for breathability. For example, the perforations could be placed at an angle in a direction so that when the composite insulation material 10 is inserted into a garment, the perforations through the outer layer 16 are directed downwardly so that any water contacting the outer layer 16 will simply run off the outer layer 16 much in the manner that water runs off a shingle, while still providing for a degree of breathability for the interlining material 10.

Figure 6:
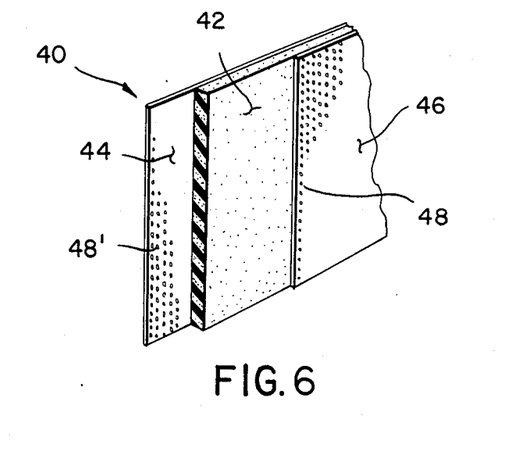
FIG. 6 is a perspective view showing a further embodiment of a composite insulation material in accordance with the present invention which is particularly suited for providing increased breatheability without substantially diminishing the heat insulating or other characteristics of the material, in which the outer layer of the composite sheet material has a plurality of tapered capillary openings therethrough.
Figure 7:
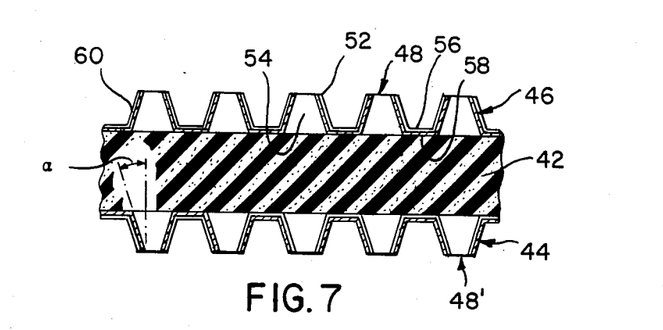
FIG. 7 is an enlarged cross-sectional view of the insulation composite material shown in FIG. 6, illustrating the apexes of the tapered capillary openings extending away from and being remote from the internal layer of the composite sheet material.
Figure 8:
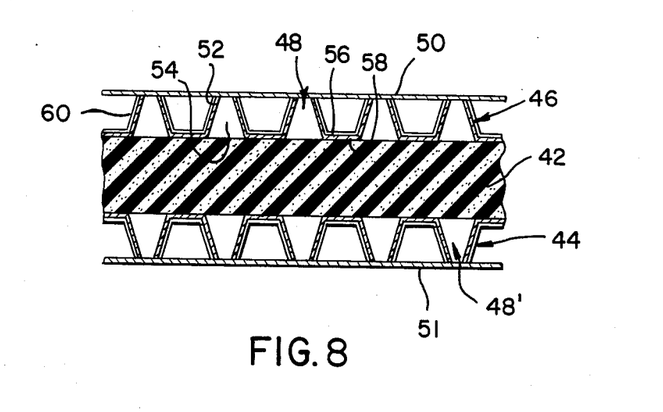
FIG. 8 is a cross-sectional view illustrating the composite insulating sheet material of FIG. 6 being disposed in relation to an outer shell of a garment or the like, thereby illustrating the standoff effect achieved with the composite insulating material of FIG. 6 in accordance with the present invention.

As shown in FIGS. 6 and 7, in accordance with another aspect of the present invention, and in particular, one directed to providing increased breatheability without substantially diminishing the heat insulating characteristics and/or the moisture resistant and wind resistant propeties of the composite insulating sheet material at least one of outer sheets 44, 46 of the composite sheet material 40 may advantageously comprise a flexible, liquid impermeable sheet 46 having a plurality of small capillary openings 48 extending therethrough. Preferably, the capillary openings 48 are of a tapered nature in which the smaller sized ends thereof extend away from the surface of the sheet 46, and the sheet 46 is oriented such that the smaller sized ends are remote from the internal layer 42 of porous material. (See FIG. 7). Also, the composite sheet material 40 is preferably used in connection with an outer fabric shell 50 of a garment or the like as illustrated in FIG. 8 of the drawings, in which the sheet 46 faces the outer shell 50 so as to be directed away from the body of the wearer. The other out sheet 44 may be of a similar construction and disposed to face an inner shell or lining 51 of the garment or the like.

More particularly, the composite insulating material 40 in accordance with this aspect of the present invention again comprises a substantially continuous internal layer 42 of porous material having low heat conductivity and high resilience, and at least one outer layer 46 adhered to one of the surfaces of the internal layer 42. The internal layer 42 preferably is of a nature to allow air to pass therethrough, such as an open celled foam, or a natural fibrous material. Alternatively, the internal layer 42 could be pierced or porolated so as to be fully breatheable. The at least one outer layer 46 comprises a flexible sheet of liquid impermeable material having a multitude of small capillary openings 48 extending therethrough for providing breatheability for the composite insulating sheet material 40. The capillary openings 48 each include a raised or protruding apex end 52 which extends away from the surface 56 of the sheet 46, as best seen in FIG. 7. The sheet 46 is adhered to the internal layer 42 at at least spaced intervals such that the raised or protruding ends 52 of the openings 48 face away from the internal layer 42, as discussed more fully hereinbelow. The other surface of the internal layer 42 may also have an outer sheet 44 adhered thereto which advantageously may comprise a similar flexible sheet of material having small capillary openings 48', although it is not necessary that the openings 48' therethrough be of a capillary nature. In this regard, what is important is that the multitude of openings 48, 48' through one of the sheets 46, 44 forming the outer layers of the composite sheet material 40 be of a capillary nature such that the flow of fluids, particularly water, therethrough is inhibited in order to thereby provide moisture resistance. In this regard the flexible sheets 44, 46 ar oriented relative to the internal layer 42 such that the raised or protruding apex ends 52 of the openings 48, 48' each face away from the internal layer 42. Also, the composite sheet 40 is to be disposed relative to the body of the wearer such that at least one of the flexible sheets 46, 44 having the capillary openings 48, 48', which face away from the internal layer 42, is remote or away from the body of the wearer. In this manner, it is the outwardly facing surface of the composite sheet material 40, when worn, which will be water resistant.

In the preferred embodiment, the small capillary openings 48 are tapered so as to be capable of more freely allowing the transfer of fluids therethrough in one direction, while inhibiting to a greater extent the reverse flow of such fluids in the opposite direction to thereby provide a diodic type effect in terms of the passage of fluids through the openings 48. In other words, the capillary openings 48 are preferably tapered so that the flow of fluids in one direction, e.g. from the smaller sized ends 52 toward the larger sized ends 44, is inhibited to a greater extent than in the opposite direction. In this instance, preferably it is the protruding or raised ends 52 of the capillary openings 48 which is of a smaller dimension, and the composite sheet material 40 is disposed relative to the body of the wearer such that the protruding smaller sized ends 52 of the capillary openings 48 face away from the body of the wearer in order to provide for a very efficient and effective water resistant effect to prevent the internal layer 42 from becoming wet from outside moisture, such as rain or snow.

In accordance with the preferred embodiment of this aspect of the present invention, the tapered capillary openings 48 in the liquid impermeable sheets 46, 44 forming the outer layers of the composite sheet material 40 may advantageously be similar to the tapered capillary openings provided in the liquid impermeable sheet material disclosed in U.S. Pat. No. 3,929,135 in the name of Thompson and entitled, "Absorptive Structure Having Tapered Capillaries", which patent is hereby incorporated by reference. However, whereas the liquid impervious sheet material of the forementioned U.S. Pat. No. 3,929,135 is disclosed as having the apexes of the tapered capillary openings in contact with an absorbent pad, in accordance with the preferred embodiment of the present invention, the apexes 52 of the tapered capillary openings 48 are directed outwardly away from the internal layer 42 of the insulating composite sheet material 40, as can best be seen in FIG. 7. In other words, the orientation of the liquid impervious sheet material 46 having the tapered capillary openings 48 therein in accordance with this aspect of the present invention is such that the apexes 52 of the openings 48, i.e. the portions of the tapered capillary openings 48 which are of a smaller dimension and which are remote from the plane of the sheet, are directed away from the internal layer 42 and are remote or spaced therefrom.

In this regard, the tapered openings 48 formed in the liquid impermeable sheet material 46, as best seen in cross section in FIG. 7, include a base or enlarged end 54 which is open to one of the surfaces 58 of the flexible sheet 46 and lies substantially in the plane of the flexible sheet 46, and a raised apex end 52 which extends away from the opposite surface 56 of the flexible sheet 46 and is remote from the plane of the sheet 46, the apex opening dimension being smaller than the base opening dimension. In the embodiment shown in FIGS. 6 and 7, the tapered capillary openings 48 are generally in the form of a frustum of a pyramid or the like having a hexagonal base, although it will be appreciated that the tapered capillary opening 48 can take the form of a frustum of any other generally tapered structure, such as a pyramid having a triangular, square or other polygonal base or which is of a conical structure. Additionally, it is to be understood that the tapered capillary openings 48 can be asymmetric (i.e. the angle of the taper on one side can be different from that on the other side), and that the angle $\alpha$ of the taper can change continuously (i.e. be curved) over the distance from the base 54 to the apex 52. In this regard, the angle $\alpha$ of the taper is defined as the angle of the tangent to the side of the capillary opening at its point of minimum apex opening dimension. Still further, included in the term "tapered" capillary opening is a slot formed in the sheet 46 in which the slot has a finite length less than the overall width or dimension of the sheet 46 itself and in which its sides and ends are tapered. Preferably, the angle of taper, represented by the symbol $\alpha$ in FIG. 7, is from about 10° to about 60°. Also, the base opening dimension refers to the maximum open measurement in the plane of the sheet 46, whereas the apex opening dimension refers to the maximum open measurement at the apex 52 of the capillary opening 48 which is remote from the plane of the sheet 46. when the tapered capillary opening 48 is in the form of a slot, however, the base opening dimension and apex opening dimension refer to the minimum open measurements in the base of the slot in the plane of the sheet and in the apex of the slot remote from the plane of the top sheet, respectively, i.e. the base and apex opening dimensions refer to the widths of the slot rather than the lengths of the slot.

The dimensions of the capillary openings 48, e.g. the base and apex opening dimensions of the tapered openings, should be chosen so as to inhibit the flow of fluids, particularly moisture or water with which the apex ends 52 come into contact, while permitting the release or flow of gases therethrough. In this manner, the composite interlining sheet material 40, when disposed relative to the body of a wearer, will be of a breatheable nature allowing the passage of air outwardly from the body of the wearer in which the composite material 40 is used, while still acting as a moisture barrier preventing the ingress of moisture or water toward the body of the wearer. In other words, the liquid impermeable sheet material 46 will serve to allow the outgress of gases, or air, while inhibiting the ingress of any moisture into the internal layer 42 which might otherwise reduce the effectiveness of the internal porous material in terms of the heat insulating characteristics provided thereby. In this regard, it will be recalled that the internal layer 42 is made of a porous material so as to be capable of entraining air or another gas therein to thereby possess excellent insulating characteristics. The presence of moisture in the internal layer 42 would otherwise reduce the heat insulating characteristics of the porous material. The preferred embodiment in which the capillary openings 48 are of a tapered nature provides an added benefit in that the small opening dimension of the apexes 52 facing outwardly from the composite sheet material 40 (for inhibiting the flow of fluids from the outside of the sheet material toward the internal layer) also effectively acts as a highly efficient wind barrier by inhibiting the free ingress of air flow into or toward the internal layer 42. In other words, the flow of air or gases outwardly is more freely permitted than the flow of air inwardly toward the body of the wearer. This also serves advantageously to increase the heat insulation characteristics or properties of the composite sheet material 40.

The opening dimensions of the capillary openings 48 should be from about 0.004" up to about 0.100", and more preferably from about 0.005" to about 0.030". This would correspond to the apex opening dimension for tapered capillaries 48 while corresponding base opening dimensions should thus be from about 0.006" to about 0.125", and more preferably from about 0.008" to 0.060". One particular material which is suitable for use in accordance with the present invention is a VISPORE X-2926 low density polyethylene film produced by Ethyl VisQueen Corporation. Such material has a nominal thickness of about 1 mil (0.001") and a multitude of tapered holes of a hexagonal base configuration, the base opening dimension being approximately 22 mils (0.022"), and the average number of holes per square inch of material being on the order of 450. The embossed thickness of the sheet, i.e. the thickness from the base 54 to the apex 52 of the openings 48, is about 17 mils (0.017"). In this regard, it will, of course, be appreciated that the number of openings 48 and the size of the openings 48 can be varied for different applications to provide for more or less breatheability depending upon the degree of activity of the wearer and the type of garment or the like in which the composite sheet material 40 is to be utilized. The preferred number of openings is preferably on the order of about 30-1500 per square inch of material. It will also be appreciated that increasing the number of holes and/or hole size will provide a more breatheable interlining material. However, an increase in breatheability is also accompanied by a slight reduction in the insulating characteristics of the material 40, but to a much lesser extent than the increase in the breatheability.

Also in accordance with the preferred embodiment, the outwardly facing surface 56 of the liquid impervious sheet material 46, i.e. the surface 56 from which the apexes 52 of the tapered capillary openings 48 extend or protrude, is substantially continuously reflective in a direction facing away from the internal layer 42 in order to provide for a decrease in the emissivity of the outer surface 56 of the composite sheet material 40. In this manner, heat conduction away from the composite sheet material 40 will be reduced when the composite sheet material 40 is oriented so that the surface 56 is facing away from the body of the wearer when the composite sheet material 40 is used in or between fabric layers of a garment, blanket, or the like to thereby provide for maximum heat retention, as discussed hereinabove. Advantageously, this highly reflective outwardly facing surface may be provided, as with the other embodiments in accordance with the present invention by depositing a reflective metalized layer 60, such as aluminum or the like, on the surface 56 of liquid impervious material after formation of the tapered capillary openings 48 in the sheet 46. Such deposition of reflective material is performed in a conventional manner. To the extent that any of the vacuum deposited reflective material covers the apexes 52 of the tapered capillary structures 48, it may be necessary to physically remove such material therefrom, which can be accomplished in any well-known manner, such as by subjecting the apexes 52 to controlled abrasion. Also, as with the embodiment shown in FIG. 5, the outwardly facing layer 60 of reflective material may be provided, if desired, with a clear transparent plastic material (not shown) thereover in order to protect the reflective material.

When such a composite sheet material 40 is used as a interlining of a garment or the like, the provision of the protruding apexes 52 of the capillary openings 48 provides an advantageous effect to enhance the heat insulating characteristics of the composite insulating sheet material 40. More particularly, this advantageous enhancement is provided in part as a result of the covering outer sheet 50 being spaced from the plane of the outer flexible sheet material 46 having the reflective coating 50 thereon, to thereby reduce physical contact between the outer shell 50 and the outwardly facing low emissive surface 60 of the composite interlining 40, and in part as a result of laminar air flow thereacross being inhibited by virtue of a "dead air" space being provided. That is, the provision of the capillary openings 48, in which the apexes 52 are spaced from and remote from the plane of the outer flexible sheet 46 adhered to the internal layer 42, provides the desired spacing means 30 discussed hereinabove with reference to FIGS. 2 and 3. In addition, the capillary openings 48 in essence serve to increase the effective thickness of the interlining sheet material 40 to provide for increased air retention for greater insulating values. The height of the apexes 52 above the outwardly facing surface 56 of the sheet material 46 preferably should be at least on the order of 2-3 mils, and more preferably, on the order of the 5-30 mils. Of course, the distance between the apexes 52 and the outwardly facing surface 56 can be greater, thereby providing for even further increases in the insulating characteristics, the upper limit being that which is commercially feasible, and yet still provides a sufficiently drapable, supple product suitable for use as an interlining sheet material for garments and the like.

A still further important feature in accordance with the aspect of the present invention illustrated with reference to FIGS. 6-8 is that the composite sheet material 40, having a great plurality or multitude of tapered capillary openings 48 therein of the nature discussed hereinabove, provides for a much quieter structure and one which is of a more supple nature. This can be a most important consideration in connection with the use of the composite sheet material 40 as an interlining in jacket-type garments or the like, particularly in light of the fact that certain interlining materials of the prior art have been of a noisy, crackly nature and have been objectionable for such reason. In this regard, it is believed that the much quieter and more supple nature of the composite sheet material 40 of the type shown in FIGS. 6-8 is due, in large part, to the increased flexibility of the outer flexible sheet 46 provided by virtue of the multitude of capillary openings 48 therethrough, thus providing for reduced internal stresses in the material. Further in this regard, the fact that the openings 48 are of a tapered nature thereby inhibiting reverse flow of fluids therethrough, allows for the provision of a great number of such openings without detrimentally reducing to any significant degree the heat insulating or other characteristics of the composite sheet material 40.

The composite sheet material 40 of the type having tapered capillary openings 48 such as shown in FIGS. 6 and 7, may also suitably be used in the manufacture of garments and the like in which no outer shell or fabric is placed thereover. This is for the reason that the capillary nature of the outwardly facing sheet 46 provides an essentially water-resistant, insulating product that will not easily pass water or moisture inwardly into the internal layer 42; rather, any water contacting the outer surface 56 will run off of the sheet material and not be conducted inwardly so as to otherwise wet or moisten the internal layer 42. Thus, because of the inhibition of reverse flow of fluids in contact with the outer flexible layer 46, the composite sheet material 40 may effectively be used directly in the manufacture of a water resistant garment without requiring a liquid impervious or substantially liquid impervious outer shell therefor. Such use of the composite sheet material 40 in this manner may be advantageous in certain instances, as the benefits of the insulating characteristics, breatheability, water resistance, and wind resistance will be afforded directly by the composite sheet material 40 itself.

Further still in this regard, even if the outwardly facing surface 56 of the composite sheet material 40 is not of a reflective or low emissive material when the composite sheet material 40 is used as an interlining for garments and the like, it will still provide substantial and significant benefits in terms of water and wind resistance, as well as heat insulation. This is for the reason that the tapered capillary openings 48 in the outer flexible sheet 46 will inhibit the flow of fluids, such as water or air, inwardly toward the internal layer 42 of porous material, irrespective of whether the outwardly facing surface 56 is reflective. Further, the protruding apexes 52 provided by the capillary openings 48 will also inherently provide for an increased spacing between the outer shell 50 and the interlining material 40, thus increasing the effective insulating characteristics by virtue of a reduction in laminar flow across the surface 56 of the interlining material 40. However, in order to optimize the insulating benefits, it is preferred that the outwardly facing surface 56 of the composite sheet material 40 be substantially continuously reflective.

From the above, it will be appreciated that the flexible sheet 46 of liquid impermeable material having a plurality of capillary openings 48 extending therethrough possesses increased breatheability, water resistance, and wind resistance characteristics by virtue of the capillary openings therethrough which inhibit the flow of fluids therethrough such as water, while allowing the passage of gases and air. Accordingly, it will be appreciated that the flexible sheet 46 of liquid impermeable material can be used with virtually any insulating material or layer having a low heat conductivity in order to improve the overall characteristics thereof in terms of breatheability, water resistance, and wind resistance, without diminishing the heat insulation characteristics thereof. Thus, the flexible sheet 46 can be used with an interlining insulation material in a garment and the like in which the sheet 46 is simiply interposed between the interlining insulation material and the outer shell of a garment and the like, the flexible sheet 46 being adhered to either the outer fabric shell or the insulation material having the desired insulation properties. In this manner, an improved overall garment and the like will be provided with the garment having water and wind resistance properties or characteristics, as well as being breatheable, without significantly inhibiting the heat insulating characteristics thereof. Therefore, it will be appreciated that the flexible sheet material 46 need not be adhered directly to the insulation material in order to provide the desired properties; rather, the flexible sheet 46 can simply be disposed in remote relationship thereto, such as when other materials such as a fabric or other sheet are interposed between the flexible sheet 46 having the capillary openings 48 therein and the layer of insulation material.

A latitude of modification, change, and substitution is intended in the foregoing disclosure, and in some instances, some features of the invention will be employed without a corresponding use of other features. Accordingly, it is appropriate that the appended claims be constructed broadly in a manner consistent with the spirit and scope of the invention herein.

What is claimed is:

1. A heat insulating garment and the like for heat retention, comprising:
    an outer fabric shell adapted to be disposed to cover a portion of the body of a wearer;
    a composite interlining sheet material for said fabric shell, said composite interlining sheet material including (i) a substantially continuous internal layer of porous material having a low heat conductivity and high resiliency, said internal layer being of a substantially uniform thickness and consistency and having a composition and thickness such that it is supple and drapable, and said internal layer having first and second surfaces, and (ii) a flexible sheet of liquid impermeable material having a first surface and a second surface, said flexible sheet having a plurality of capillary openings extending therethrough, each of said openings having a base open to said first surface of said flexible sheet and lying substantially in the plane of said flexible sheet, and an apex extending away from said second surface of said flexible sheet and remote from the plane of said flexible sheet, said openings being of a character so as to inhibit the flow of fluids through said openings, and said flexible sheet being adhered to said internal layer so that said first surface of said flexible sheet faces said first surface of said internal layer and said second surface of said flexible sheet faces away from said internal layer so that said apexes of said openings are remote from said first surface of said internal layer; and
    said composite interlining sheet material being disposed in fixed relation to said outer fabric shell.

2. The garment and the like of claim 1, wherein the size of said openings at said base are greater than the size of said openings at said apex such that said openings form tapered capillaries.

3. The garment and the like of claim 1, wherein said flexible sheet of liquid impermeable material comprises a first flexible sheet of liquid impermeable material, and further including a second flexible sheet of liquid impermeable material adhered to said second surface of said internal layer.

4. The garment and the like of claim 3, wherein said second flexible sheet of liquid impermeable material has a plurality of openings extending therethrough.

5. The garment and the like of claim 4, wherein said openings in said second flexible sheet comprise capillary openings having a base open to one surface of said second flexible sheet and lying substantially in the plane of said second flexible sheet and an apex extending away from the other surface of said second flexible sheet and remote from the plane of said second flexible sheet.

6. The garment and the like of claim 5, wherein said one surface of said second flexible sheet is adhered to said second surface of said internal layer.

7. The garment and the like of claim 3, wherein said second surface of said first flexible sheet is substantially continuously reflective in a direction facing away from said first surface of said first flexible sheet, and wherein said second flexible sheet has a first surface facing said internal layer and a second surface which is nonreflective.

8. The garment and the like of claim 7, wherein said second reflective surface of said first flexible sheet comprises a layer of metallized reflective material deposited on said first flexible sheet.

9. The garment and the like of claim 8, further including a layer of transparent material overlying said layer of metallized reflective material.

10. The heat insulating garment and the like of claim 4, wherein said internal layer is perforated.

11. The garment and the like of claim 1, wherein the size of said openings at said apex is in the range from about 0.004" to 0.100".

12. The garment and the like of claim 1, wherein the height of said apexes of said openings above said second surface of said flexible sheet is in the range of from about 0.005" to about 0.030".

13. The garment and the like of claim 1, wherein said flexible sheet comprises a sheet of polyethylene.

14. The garment and the like of claim 1, wherein the number of openings in said flexible sheet is on the order of 30 to 1500 per square inch.

15. The garment and the like of claim 1, wherein said composite sheet material is disposed relative to said outer fabric shell so that said second surface of said flexible sheet is disposed to face away from the body of the wearer when said outer fabric shell is disposed to cover a portion of the body of the wearer.

16. An insulating composite interlining sheet material comprising:
   a substantially continuous internal layer of porous material having a low heat conductivity and high resiliency, said internal layer being of a substantially uniform thickness and consistency and having a composition and thickness such that it is supple and drapable, and said internal layer having first and second surfaces;
   a flexible sheet of liquid impermeable material having a first surface and a second surface, said flexible sheet having a plurality of capillary openings extending therethrough, each of said openings having a base open to said first surface of said flexible sheet and lying substantially in the plane of said flexible sheet, and an apex extending away from said second surface of said flexible sheet and remote from the plane of said flexible sheet, said openings being of a character so as to inhibit the flow of fluids through said openings; and
   said flexible sheet being adhered to said internal layer at at least spaced intervals so that said first surface of said flexible sheet faces said first surface of said internal layer and said second surface of said flexible sheet faces away from said internal layer so that said apexes of said openings are remote from said first surface of said internal layer.

17. The composite sheet material of claim 16, wherein the size of said openings at said base are greater than the size of said openings at said apex such that said openings form tapered capillaries.

18. The composite sheet material of claim 16 wherein said flexible sheet of liquid impermeable material comprises a first flexible sheet of liquid impermeable material, and further including a second flexible sheet of liquid impermeable material adhered to said second surface of said internal layer.

19. The composite sheet material of claim 18, wherein said second flexible sheet of liquid impermeable material has a plurality of openings extending therethrough.

20. The composite sheet material of claim 19, wherein said openings in said second flexible sheet comprise capillary openings having a base open to one surface of said second flexible sheet and lying substantially in the plane of said second flexible sheet and an apex extending away from the other surface of said second flexible sheet and remote from the plane of said second flexible sheet.

21. The composite sheet material of claim 20, wherein said one surface of said second flexible sheet is adhered to said second surface of said internal layer.

22. The composite sheet material of claim 18 wherein said second surface of said first flexible sheet is substantially continuously reflective in a direction facing away from said first surface of said first flexible sheet, and wherein said second flexible sheet has a first surface facing said internal layer and a second surface which is nonreflective.

23. The composite sheet material of claim 22 wherein said second reflective surface of said first flexible sheet comprises a layer of metallized reflective material deposited on said first flexible sheet.

24. The composite sheet material of claim 19, wherein said internal layer is perforated.

25. The composite sheet material of claim 16, wherein the size of said openings at said apex is in the range from about 0.004" to 0.100".

26. The composite sheet material of claim 16, wherein the height of said apexes of said openings above said second surface of said flexible sheet is in the range of from about 0.005" to about 0.030".

27. The composite sheet material of claim 16, wherein said flexible sheet material comprises a sheet of polyethelene.

28. The composite sheet material of claim 16, wherein the number of openings in said flexible sheet is on the order of 30 to 1500 per square inch.

29. A heat insulating composite sheet material for garments and the like, said composite sheet material comprising:

a substantially continuous internal layer of porous material having a low heat conductivity and high resiliency, said internal layer being of a substantially uniform thickness and consistency and having a composition and thickness such that it is supple and drapable, and said internal layer having first and second surfaces;

a flexible sheet of liquid impermeable material having a first surface and a second surface, said flexible sheet having a plurality of capillary openings extending therethrough, each of said openings having a base open to said first surface of said flexible sheet and lying substantially in the plane of said flexible sheet, and an apex extending away from said second surface of said flexible sheet and remote from the plane of said flexible sheet, said openings being of a character so as to inhibit the flow of fluids through said openings; and said flexible sheet being adhered to said internal layer so that said first surface of said flexible sheet faces said first surface of said internal layer and said second surface of said flexible sheet faces away from said internal layer so that said apexes of said openings are remote from said first surface of said internal layer.

30. The composite sheet material of claim 29, wherein the size of said openings at said base are greater than the size of said openings at said apex such that said openings form tapered capillaries.

31. The composite sheet material of claim 29, wherein said flexible sheet of liquid impermeable material comprises a first flexible sheet of liquid impermeable material, and further including a second flexible sheet of liquid impermeable material adhered to said second surface of said internal layer.

32. The composite sheet material of claim 31, wherein said second flexible sheet of liquid impermeable material has a plurality of openings extending therethrough.

33. The composite sheet material of claim 32, wherein said openings in said second flexible sheet comprise capillary openings having a base open to one surface of said second flexible sheet and lying substantially in the plane of said second flexible sheet and an apex extending away from the other surface of said second flexible sheet and remote from the plane of said second flexible sheet.

34. The composite sheet material of claim 33, wherein said one surface of said second flexible sheet is adhered to said second surface of said internal layer.

35. The composite sheet material of claim 32, wherein said internal layer is perforated.

36. The composite sheet material of claim 29, wherein the size of said openings at said apex is in the range from about 0.004" to 0.100".

37. The composite sheet material of claim 29, wherein the height of said apexes of said openings above said second surface of said flexible sheet is in the range of from about 0.005" to about 0.030".

38. The composite sheet material of claim 29, wherein said flexible sheet material comprises a sheet of polyethelene.

39. The composite sheet material of claim 29, wherein the number of openings in said flexible sheet is on the order of 30 to 1500 per square inch.

40. A heat insulating garment and the like for heat retention, comprising:

an outer fabric shell adapted to be disposed to cover a portion of the body of a wearer:

a composite interlining sheet material for said fabric shell, said composite interlining sheet material including (i) a substantially continuous internal layer of porous material having a low heat conductivity and high resiliency, said internal layer being of a substantially uniform thickness and consistency and having a composition and thickness such that it is supple and drapable, and said internal layer having first and second surfaces, and (ii) a flexible sheet of liquid impermeable material having a first surface and a second surface, said second surface of said flexible sheet being substantially continuously reflective in a direction facing away from said first surface of said sheet, said flexible sheet having a plurality of capillary openings extending therethrough, each of said openings having a base open to said first surface of said flexible sheet and lying substantially in the plane of said flexible sheet, and an apex extending away from said second surface of said flexible sheet and remote from the plane of said flexible sheet, said openings being of a character so as to inhibit the flow of fluids through said openings, and said flexible sheet being adhered to said internal layer so that said first surface of said flexible sheet faces said first surface of said internal layer and said second surface of said flexible sheet faces away from said internal layer so that said apexes of said openings are remote from said first surface of said internal layer; and said composite interlining sheet material being disposed in fixed relation to said outer fabric shell.

41. The garment and the like of claim 40, wherein the size of said openings at said vase are greater than the size of said openings at said apex such that said openings form tapered capillaries.

42. The garment and the like of claim 40, wherein said flexible sheet of liquid impermeable material comprises a first flexible sheet of liquid impermeable material, and further including a second flexible sheet of liquid impermeable material adhered to said second surface of said internal layer.

43. The garment and the like of claim 42, wherein said second flexible sheet of liquid impermeable material has a plurality of openings extending therethrough.

44. The garment and the like of claim 43, wherein said openings in said second flexible sheet comprise capillary openings having a base open to one surface of said second flexible sheet and lying substantially in the plane of said second flexible sheet and an apex extending away from the other surface of said second flexible sheet and remote from the plane of said second flexible sheet.

45. The garment and the like of claim 44, wherein said one surface of said second flexible sheet is adhered to said second surface of said internal layer.

46. The garment and the like of claim 40, wherein the size of said openings at said apex is in the range from about 0.004" to 0.100".

47. The garment and the like of claim 40, wherein the height of said apexes of said openings above said second surface of said flexible sheet is in the range of from about 0.005" to about 0.030".

48. The garment and the like of claim 40, wherein said flexible sheet comprises a sheet of polyethelene.

49. The garment and the like of claim 40, wherein the number of openings in said flexible sheet is on the order or 30 to 1500 per square inch.

50. The garment and the like of claim 40, wherein said composite sheet material is disposed relative to said outer fabric shell so that said second surface of said flexible sheet is disposed to face away from the body of the wearer when said outer fabric shell is disposed to cover a portion of the body of the wearer.

51. A reversible garment and the like for maximizing heat retention when the garment and the like is disposed in a first orientation relative to the body of the wearer and for minimizing heat retention when the garment and the like is disposed in a second reversible orientation relative to the body of a wearer, said reversible garment comprising:

an outer fabric shell adapted to be disposed in a first orientation to cover the portion of the body of a wearer and in a second reversible orientation to cover the portion of the body of a wearer;

a composite interlining sheet material for said fabric shell, said composite interlining sheet material including (i) a substantially continuous internal layer of porous material having a low heat conductivity and high resiliency, said internal layer being of a substantially uniform thickness and consistency and having a composition and thickness such that it is supple and drapable, and said internal layer having first and second surfaces, (ii) a flexible sheet of liquid impermeable material having a first surface and a second surface, said second surface of said flexible sheet being substantially continuously reflective in a direction facing away from said first surface of said sheet, said flexible sheet having a plurality of capillary openings extending therethrough, each of said openings having a base open to said first surface of said flexible sheet and lying substantially in the plane of said flexible sheet, and an apex extending away from said second surface of said flexible sheet and remote from the plane of said flexible sheet, said openings being of a character so as to inhibit the flow of fluids through said openings, and said flexible sheet being adhered to said internal layer so that said first surface of said flexible sheet faces said first surface of said internal layer and said second surface of said flexible sheet faces away from said internal layer so that said apexes of said openings are remote from said first surface of said internal layer and so that said second reflective surface of said flexible sheet serves to decrease the emissivity of said composite sheet material and reduce the conduction of heat in a direction away from said second surface of said internal layer twoard said first surface of said internal layer; and (iii) the surface of said composite interlining sheet material which faces away from said flexible sheet of liquid impermeable material b3eing nonreflective; and said composite interlining sheet material being disposed in fixed relation relative to said outer fabric shell so that said second surface of said flexible sheet is disposed so as to face away from the body of the wearer when said outer fabric shell is disposed in said first orientation to thereby maximize heat retention and so that said second surface of said flexible sheet faces toward the body of the wearer when said outer fabric shell is disposed in said second reversible orientation to thereby minimize heat retention.

52. The reversible garment and the like of claim 51, wherein the size of said openings at said base are greater than the size of said openings at said apex such that said openings form tapered capillaries.

53. The reversible garment and the like of claim 51, wherein said flexible sheet of liquid impermeable material comprises a first flexible sheet of liquid impermeable material, and further including a second flexible sheet of liquid impermeable material adhered to said second surface of said internal layer.

54. The reversible garment and the like of claim 53, wherein said second flexible sheet of liquid impermeable material has a plurality of openings extending therethrough.

55. The reversible garment and the like of claim 54, wherein said openings in said second flexible sheet comprise capillary openings having a base open to one surface of said flexible sheet and lying substantially in the plane of said second flexible sheet and an apex extending away from the other surface of said second flexible sheet and remote from the plane of said second flexible sheet.

56. The reversible garment and the like of claim 55, wherein said one surface of said second flexible sheet is adhered to said second surface of said internal layer.

57. An insulating composite interlining sheet material comprising:

a substantially continuous internal layer of porous material having a low heat conductivity and high resilience, said internal layer being of a substantially uniform thickness and consistency and having a composition and thickness such that it is supple and drapable, and said internal layer having first and second surfaces;

a flexible sheet of liquid impermeable material having a first surface and a second surface, said second surface of said flexible sheet being substantially continuously reflective in a direction facing away from said first surface of said sheet, said flexible sheet having a plurality of capillary openings extending therethrough, each of said openings having a base open to said first surface of said flexible sheet and lying substantially in the plane of said flexible sheet, and an apex extending away from said second surface of said flexible sheet and remote from the plane of said flexible sheet, said openings being of a character so as to inhibit the flow of fluids through said openings;

said flexible sheet being adhered to said internal layer at at least spaced intervals so that said first surface of said flexible sheet faces said first surface of said internal layer and said second surface of said flexible sheet faces away from said internal layer so that said apexes of said openings are remote from said first surface of said internal layer.

58. The composite sheet material of claim 57, wherein the size of said openings at said base are greater than the size of said openings at said apex such that said openings form tapered capillaries.

59. The composite sheet material of claim 57, wherein said flexible sheet of liquid impermeable material comprises a first flexible sheet of liquid impermeable material, and further including a second flexible sheet of liquid impermeable material adhered to said second surface of said internal layer.

60. The composite sheet material of claim 59, wherein said second flexible sheet of liquid impermeable material has a plurality of openings extending therethrough.

61. The composite sheet material of claim 60, wherein said openings in said second flexible sheet comprise capillary openings having a base open to one surface of said second flexible sheet and lying substantially in the plane of said second flexible sheet and an apex extending away from the other surface of said second flexible sheet and remote from the plane of said second flexible sheet.

62. The composite sheet material of claim 61, wherein said one surface of said second flexible sheet is adhered to said second surface of said internal layer.

63. The composite sheet material of claim 57, wherein the size of said openings at said apex is in the range from about 0.004" to 0.100".

64. The composite sheet material of claim 57, wherein the height of said apexes of said openings above said second surface of said flexible sheet is in the range of from about 0.005" to about 0.030".

65. The composite sheet material of claim 57, wherein said flexible sheet comprises a sheet of polyethelene.

66. The composite sheet material of claim 57, wherein the number of openings in said flexible sheet is on the order of 30 to 1500 per square inch.

67. A garment and the like comprising:
a fabric shell adapted to be disposed to cover a portion of the body of the wearer;
an insulation layer of porous material having a low heat conductivity and a composition and thickness such that it is supple and drapable, said insulation layer being disposed in fixed relationship to said fabric shell;
a flexible sheet of liquid impermeable material having a first surface and a second surface, said flexible sheet having a plurality of capillary openings extending therethrough, each of said openings having a base open to said first surface of said flexible sheet and lying substantially in the plane of said flexible sheet, and an apex extending away from said second surface of said flexible sheet and remote from the plane of said flexible sheet, said openings being of a character to inhibit the flow of fluids through said openings; and
said flexible sheet being disposed in fixed relationship with respect to said fabric shell and said insulation layer so that said insulation layer is disposed intermediate said flexible sheet and the body of the wearer when said fabric shell is disposed to cover a portion of the body of a wearer, and said flexible sheet being oriented so that said first surface of said flexible sheet faces toward said insulation layer and said second surface of said flexible sheet faces away from said insulation layer so that said apexes of said openings are remote from the body of the wearer when said fabric shell is disposed to cover a portion of the body of the wearer.

68. The garment and the like of claim 67, wherein said flexible sheet is adhered at at least spaced intervals to one of said fabric shell and said insulation layer.

69. The garment and the like fo claim 67, wherein said fabric shell comprises an outer fabric shell, and wherein said flexible sheet is interposed between said outer fabric shell and said insulation layer.

70. A composite sheet material for garments and the like, said composite sheet material comprising:
an insulation layer of porous material having a low heat conductivity and a composition and thickness such that it is supple and drapable;
a flexible sheet of liquid impermeable material having a first surface and a second surface, said flexible sheet having a plurality of capillary openings extending therethorugh, each of said openings having a base open to said first surface of said flexible sheet and lying substantially in the plane of said flexible sheet, and an apex extending away from said second surface of said flexible sheet and remote from the plane of said flexible sheet, said openings being of a character so as to inhibit the flow of fluids through said openings; and
said flexible sheet being adhered to said insulation layer so that said first surface of said flexible sheet faces said insulation layer and said second surface of said flexible sheet faces away from said insulation layer so that said apexes of said openings are remote from said insulation layer.

* * * * *

UNITED STATES PATENT AND TRADEMARK OFFICE
CERTIFICATE OF CORRECTION

PATENT NO. : 4,685,155

DATED : August 11, 1987

INVENTOR(S) : Fingerhut et al.

It is certified that error appears in the above-identified patent and that said Letters Patent is hereby corrected as shown below:

Column 2, line 4, "againstextreme" should read --against extreme--.

Column 6, line 35, "aras" should read --areas--;
         line 39, "proous" should read --porous--.

Column 16, line 38, delete "50" and insert therefor --60--.
          line 54, delete "the" and insert therefor --from--.

Column 18, line 10, "simiply" should read --simply--.

Column 22, line 38, delete "vase" and insert therefor --base--.

Column 23, line 55, "twoard" should read --toward--.
          line 59, "b3eing" should read --being--.

Column 26, line 19, "fo" should read --of--.
          line 31, "therethorugh" should read --therethrough--.

Signed and Sealed this

Nineteenth Day of January, 1988

Attest:

DONALD J. QUIGG

*Attesting Officer*   Commissioner of Patents and Trademarks